No. 803,635. PATENTED NOV. 7, 1905.
D. STAHLHUT.
FAN ATTACHMENT FOR BICYCLES.
APPLICATION FILED JULY 18, 1904.
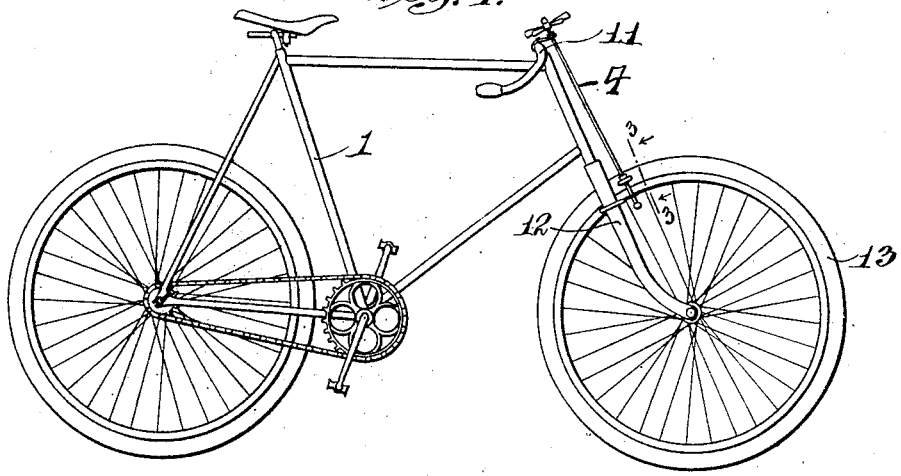
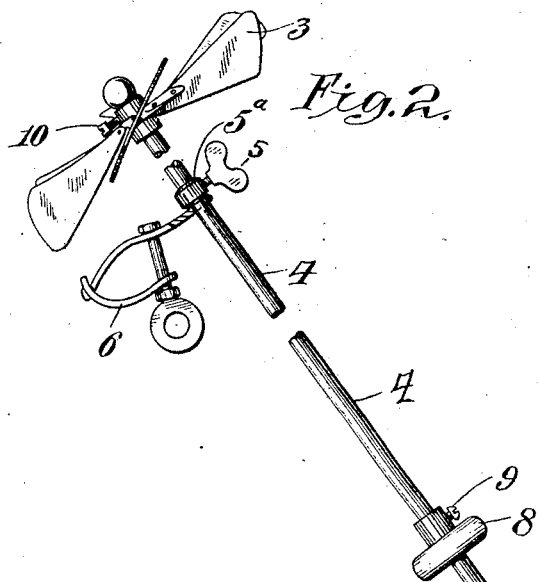
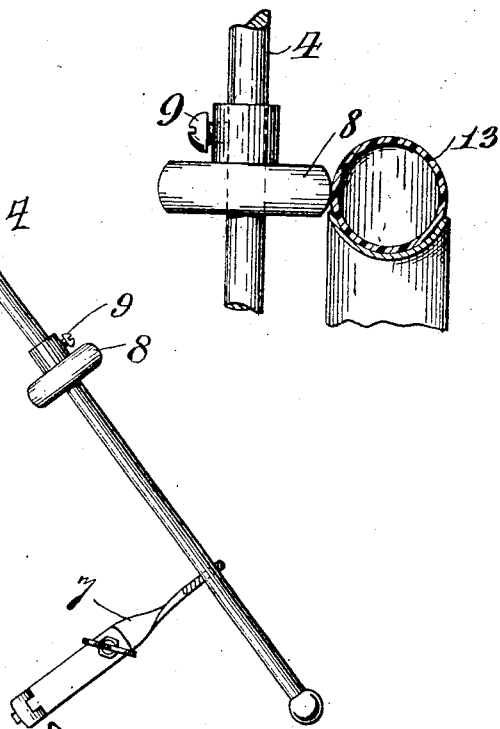

UNITED STATES PATENT OFFICE.

DIEDRICH STAHLHUT, OF NEW YORK, N. Y.

FAN ATTACHMENT FOR BICYCLES.

No. 803,635.     Specification of Letters Patent.     Patented Nov. 7, 1905.

Application filed July 18, 1904. Serial No. 216,934.

*To all whom it may concern:*

Be it known that I, DIEDRICH STAHLHUT, a citizen of the United States, residing at No. 1434 Second avenue, in the borough of Manhattan, city, county, and State of New York, have invented a new and useful Fan Attachment for Bicycles, of which the following is a specification.

This invention relates to attachments for bicycles, and more particularly to a fan attachment; and one object of the invention is to provide a simple and efficient construction which may derive power from the front wheel of a bicycle and will operate to set up a current of air, and thus fan the rider of the machine.

In the drawings forming a portion of this specification, and in which similar numerals of reference designate corresponding parts in the several views, Figure 1 is a side elevation of a bicycle equipped with the fan-operating mechanism and a fan. Fig. 2 is a front elevation of the bracket, the fan, and the driving-wheel of the mechanism and its attaching means. Fig. 3 is a side view of the driving-wheel in contact with the rubber tire of the bicycle-wheel.

Referring now to the drawings, 4 represents a rod to the top of which is screwed the fan 3, which is held in position by a screw 10. The rod runs through two perforated brackets 6 and 7, one of which is fastened to the handle-bar 11 of the bicycle and the other to the yoke 12. The driving-wheel 8, which is mounted upon the rod 4, is fastened with a screw 9 in a position to come into contact with the rubber tire of the bicycle 13 and can be put in motion at the will of the rider by dropping the rod by means of the set-screw 5 and the loose collar 5ª, through which the said screw works to adjust the said rod, this collar being adapted to rest on and be supported by the bracket 6—that is, if it is desired to set the fan in motion the rod 4 is lowered sufficiently to have the driving-wheel come in contact with the rubber tire of the bicycle, and as the front wheel of the bicycle is turned to move the bicycle the fan mechanism will turn with it, and if the fan is not desired to be in operation the rod is lifted up sufficiently to remove the driving-wheel from the tire and is again held in position by the set-screw 5.

It will of course be understood that in practice any style of set-screws and any style of fan may be employed for the device and that the specific construction and the material may be varied without departing from the spirit of the invention. Also while the present invention is shown as applied to a bicycle it will be understood that it may be employed in any connection to which it is adapted.

Having thus described the invention, what is claimed is—

1. An attachment for bicycles, comprising two perforated brackets, a rod run through the perforations of said brackets so as to rotate therein, a set-screw and collar for adjusting the rod and holding it in position, a small drive-wheel mounted adjustably between the said brackets upon the said rod in contact with a running wheel of the bicycle to transmit motion and a fan mounted on the upper end of said rod substantially as set forth.

2. An attachment for bicycles, comprising two perforated brackets, a rod run through the perforations of said brackets so as to rotate therein, a collar and set-screw adjustably holding the rod in position, a small driving-wheel mounted between the said perforated brackets upon the said rod in adjustable contact with a running wheel of the bicycle to transmit motion and a fan mounted on top of the said rod and held in position by a screw 10 substantially as set forth.

In testimony that I claim the foregoing as my own I have hereto affixed my signature in the presence of two witnesses.

DIEDRICH STAHLHUT.

Witnesses:
FRANK G. BRUNS,
JOHN KEIM, Jr.